US008114489B2

(12) United States Patent
Nemat-Nasser et al.

(10) Patent No.: US 8,114,489 B2
(45) Date of Patent: Feb. 14, 2012

(54) COMPOSITE MATERIAL HAVING LOW ELECTROMAGNETIC REFLECTION AND REFRACTION

(75) Inventors: Syrus C. Nemat-Nasser, La Jolla, CA (US); Willie J. Padilla, La Jolla, CA (US); David R. Smith, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/153,502

(22) Filed: May 22, 2002

(65) Prior Publication Data

US 2003/0002045 A1 Jan. 2, 2003

Related U.S. Application Data

(60) Provisional application No. 60/293,070, filed on May 23, 2001.

(51) Int. Cl.
*B32B 27/00* (2006.01)
*B32B 27/02* (2006.01)
*B32B 27/04* (2006.01)
*B32B 27/06* (2006.01)

(52) U.S. Cl. ..................... 428/34.1; 428/34.2; 428/35.7; 428/35.9; 428/36.9; 428/98; 343/785; 343/872

(58) Field of Classification Search .................... 428/98, 428/34.1, 34.2, 35.7, 35.9, 36.9; 343/785, 343/872
See application file for complete search history.

(56) References Cited

U.S. PATENT DOCUMENTS

| | | | | |
|---|---|---|---|---|
| 3,934,566 | A | 1/1976 | Ward | 123/119 E |
| 5,498,644 | A * | 3/1996 | Reo | 523/218 |
| 5,600,342 | A | 2/1997 | Pikulski et al. | |
| 5,606,335 | A * | 2/1997 | English et al. | 343/909 |
| 5,635,453 | A | 6/1997 | Pique et al. | 505/239 |
| 6,034,638 | A | 3/2000 | Thiel et al. | 343/702 |
| 6,097,271 | A | 8/2000 | Kozakoff | 333/204 |
| 6,117,517 | A | 9/2000 | Diaz et al. | 428/102 |
| 6,469,682 | B1 | 10/2002 | de Maagt et al. | |
| 6,483,481 | B1 | 11/2002 | Sievenpiper et al. | |
| 6,759,985 | B2 | 7/2004 | Acher et al. | |
| 6,791,432 | B2 * | 9/2004 | Smith et al. | 333/99 S |
| 7,015,865 | B2 | 3/2006 | Isaacs et al. | |
| 7,538,946 | B2 | 5/2009 | Smith et al. | |
| 2001/0038325 | A1 | 11/2001 | Smith et al. | |
| 2006/0125681 | A1 | 6/2006 | Smith et al. | 342/120 |
| 2006/0243925 | A1 | 11/2006 | Barker et al. | |
| 2010/0067091 | A1 | 3/2010 | Smith et al. | |

OTHER PUBLICATIONS

V.G. Veselago, "The Electrodynamics of Substances with Simultaneously Negative Values of ϵ and ∈", Jan.-Feb. 1968, vol. 10, No. 4, p. 509-514.

Verma A. K. et al., "Resonance Frequency of Anisotropic Multilayer Rectangular Microstrip Patch using MWM," Electronics Letters, IEE Stevenage, GB, vol. 34, No. 4. Feb. 19, 1998.

Losada V. et al., "Full-wave analysis of circular microstrip resonators in multilayered media containing uniaxial anisotropic dielectrics, magnetized ferrites, and chiral materials," IEEE Transactions on Microwave Theory and Techniques, vol. 48, No. 6. Jun. 6, 2000.

Lindell I. V., et al., "BW media-media with negative parameters, capable of supporting backward waves," Microwave and Optical Technology Letters, vol. 31, No. 2. Oct. 20, 2001.

R.N. Bracewell, *Analogues of an Ionized Medium. Wireless Engineer*, pp. 320-326, Dec. 1954.

Walter Rotman, *Plasma Simulation by Artificial Dielectrics and Parallel-Plate Media. PGAP*, pp. 82-95, Oct. 1961.

D.R. Smith, R. Dalichaouch, N. Kroll, S. Schultz, P.M. McCall, and S.L. Platzman; *Photonic and Structure and Defects in One and Two Dimensions. Journal of the Optical Society of America B*, 10(2): 314-321, 1993.

J.B. Pendry, A.J. Holden, W.J. Stewart, and I. Youngs; *Extremely Low Frequency Plasmons in Metallic Mesostructures. Physical Review Letters*, 76(25): 4773-4776, 1996.

W. Bruns, *GdfidL: A Finite Difference Program for Arbitrarily Small Perturbations in Rectangular Geometries. IEEE Transactions on Magnetics*, 32(3): 1453-1456, 1996.

J.B. Pendry, A.J. Holden, D.J. Robbins, and W.J. Stewart; *Low Frequency Plasmons in Thin-Wire Structure. J. Phys.: Condens. Matter*, 10: 4785-4809, 1998.

D.R. Smith, D.C. Vier, W. Padilla, S.C. Nemat-Nasser, and S. Schultz; *Loop-Wire Medium For Investigating Plasmons at Microwaves Frequencies. Applied Physics Letters*, 75(10): 1425-1427, 1999.

J.B. Pendry, A.J. Holden, D.J. Robbins, and W.J. Stewart; *Magnetism From Conductors and Enhanced Nonlinear Phenomena. IEEE Transactions on Microwave Theory and Techniques*, 47(11): 2075-2084, 1999.

D.R. Smith, W .J. Padilla, D.C. Vier, S.C. Nemat-Nasser, and S. Schultz: *Composite Medium With Simultaneously Negative Permeability and Permittivity. Physical Review Letters*, 84(18): 4184-4187, 2000.

* cited by examiner

*Primary Examiner* — Marc A Patterson

(74) *Attorney, Agent, or Firm* — Greer, Burns & Crain Ltd.

(57) ABSTRACT

A composite material has a host dielectric with an artificial plasmon medium embedded in the host. The artificial plasmon medium has a dielectric function of less than 1, and a plasma frequency selected to result in the permittivity of the composite being substantially equal to 1.

29 Claims, 9 Drawing Sheets

COMPOSITE MATERIAL HAVING LOW ELECTROMAGNETIC REFLECTION AND REFRACTION

CROSS REFERENCE

The present application claims priority under 35 U.S.C. §119 on U.S. Provisional Patent Application No. 60/293,070 filed May 23, 2001.

STATEMENT OF GOVERNMENT INTEREST

This invention was made with government support under Award No. DAAD19-00-1-0525 awarded by the Army Research Office. The government has certain rights in the invention.

FIELD OF THE INVENTION

The present invention is related to materials having low electromagnetic reflection and refraction. The invention generally concerns materials provided to control electromagnetic reflection and refraction.

BACKGROUND OF THE INVENTION

The behavior of electromagnetic radiation is altered when it interacts with charged particles. Whether these charged particles are free, as in plasmas, nearly free, as in conducting media, or restricted, as in insulating or semi conducting media—the interaction between an electromagnetic field and charged particles will result in a change in one or more of the properties of the electromagnetic radiation. Because of this interaction, media and devices can be produced that generate, detect, amplify, transmit, reflect, steer, or otherwise control electromagnetic radiation for specific purposes.

The behavior of electromagnetic radiation interacting with a material can be predicted by knowledge of the material's electromagnetic materials parameters $\in$ and $\mu$ where $\in$ is the electric permittivity of the medium, and $\mu$ is the magnetic permeability of the medium. These parameters represent a macroscopic response averaged over the medium, the actual local response being more complicated to describe and generally not necessary to describe the electromagnetic behavior.

Reflection and transmission at the interface between two media are governed by the index of refraction $\eta$ and impedance z of each medium. The index $\eta$ and the impedance z are directly related to the reflection and transmission properties of a slab of material, and hence are the observable quantities that correspond directly to the electromagnetic performance of materials. The index of refraction $\eta$ and the impedance z can be expressed in relative terms in relation to corresponding properties for free space as:

$$\eta=[(\in\mu)/(\in_0\mu_0)]^{1/2}$$

$$z=(\mu/\in)^{1/2}/(\mu_0/\in_0)^{1/2}$$

where the subscript 0 indicates free space values associated with a vacuum. Air has very nearly the index of refraction and impedance of vacuum. Thus, the relative index of refraction and the relative electromagnetic impedance z of air are often taken to be equal to unity. Note that the permittivity and permeability can be found from the index and the impedance using the above relations, as $\in=\eta/z$ and $\mu=\eta z$.

In addition to having low material losses, a material that is electromagnetically "transparent" will have both its index of refraction and impedance numerically close to that of the surrounding medium. Such a material is valuable for many applications. For example, airplanes may have a collision detection radar system mounted near their "nose." This system operates inside a composite dome known as a radome that has a shape optimized for aerodynamic properties. The radar system must compensate for the lensing effects of the shaped radome composite material, which typically has a relative index of refraction that is significantly greater than unity. Such compensation requires effort and expense, and is subject to error.

By way of additional example, structural materials may be used to embed a sensor such as an array of antennas in a wireless communications device. Reflection and refraction effects in these structural materials are likewise undesirable. In both of these applications, material requirements, irrespective of their electromagnetic reflection and refraction properties, include physical properties such as strength, ductility, and resistance to heat, cold, and moisture. The prior art has had limited success in satisfying these needs.

Materials and methods for generally minimizing electromagnetic reflection and maximizing transparency have been proposed. For example, materials have been proposed that have a high absorption of incident radiation at microwave and other frequencies. In addition to preventing transmission of radiation, the strong absorbance of these materials often leads to a substantial reflected component. As a result, use of these materials is usually accompanied by irregular material shapes and surface angles required to direct the reflected component in a desired direction. The required irregular surface angles and shapes significantly limit the utility of such materials and methods.

Also, the prior art has employed particular naturally occurring media that may be found in nature or that can be formed by known chemical synthesis and that may have a low level of electromagnetic reflection over a particular frequency range. Use of such media is disadvantageously limited to these particular frequency ranges. Also, it is difficult to find media with significant permeability at RF and higher frequencies. These media may also be structurally unsuitable for many applications.

Previous study of the effects of so-called "artificial dielectric" materials on electromagnetic waves has been performed. For example, artificial dielectric materials based on arrays of substructures that collectively have a desired response to electromagnetic radiation have been studied. These arrays, which need not necessarily be periodic in nature, have in common that the dimensions and spacing of the scattering elements are less than the wavelengths over which the composite material will operate. It is found that by averaging the local electromagnetic fields over such a structure, an effective permittivity (and/or permeability) function can be applied that roughly describes the scattering properties of the composite. The procedure that arrives at this description is known in the literature as "effective medium theory."

An example of a prior art artificial dielectric material is the "rodded" medium, used as an analogue medium to study propagation of electromagnetic waves through the ionosphere [See, e.g., R. N. Bracewell, "Analogues of an Ionized Medium", Wireless Engineer, 31:320-6, December 1954, herein incorporated by reference]. An artificial medium based on conducting wires or posts has a dielectric function identical to that describing a dilute, collisionless neutral plasma. Accordingly, as used herein a medium based on conducting wires will be referred to as a "plasmonic" medium. More recently, artificial plasmonic media have been proposed using, for example, a periodic arrangement of very thin conducting wires. See, e.g., J. B. Pendry et al., "Extremely low frequency plasmons in metallic mesostructures", Physical Review Letters, 76(25):4771-6, 1996; see also D. R. Smith et al., "Loop-wire for investigating plasmons at microwave frequencies," Applied Physics Letters, 75(10):1425-7, 1999; both of which are incorporated herein by reference.

Other recent examples of artificial dielectrics include the use of random arrangements of metal "needles" suspended in a foam structure as a "lens" with an index of refraction greater than unity. Many foam-like materials have a refractive index approximately equal to unity. Adding needles serves to increase the index for low-frequency RF radiation as with radio astronomy. These materials, however, are not acceptable for applications requiring a degree of mechanical strength.

To date, these prior art efforts have not been successful in providing materials that have a low reflectance and good transparency at a desired wavelength in addition to having advantageous structural mechanical properties.

Unresolved needs in the art therefore exist.

SUMMARY OF THE INVENTION

The present invention is directed to a composite material comprising a host dielectric medium having an index of refraction greater than 1, and an artificial plasmon medium embedded in the host medium. The artificial plasmon medium has a dielectric function of less than one so that the permittivity of the composite material is substantially equal to that of the surrounding medium for incident electromagnetic radiation of a desired frequency.

Composite media of the invention thus can be of utility as materials that are highly transparent and exhibit minimal reflectance or refraction for electromagnetic waves in a desired frequency range. Also, composite media embodiments of the present invention can be "tuned" for achieving transparency and/or minimal reflection and refraction for electromagnetic waves in the desired frequency range through selection of particular conductor/host materials, conductor/host sizing and/or spacing, and conductor/host geometric configuration. Further, composite media of the present invention allow for achieving these desired electromagnetic properties (e.g., transparency and low reflection) while providing advantageous structural and mechanical properties, with the result that embodiments of the present invention will be well suited for applications such as radomes, antennas, and the like.

The above brief description sets forth broadly some of the features and advantages of the present disclosure so that the detailed description that follows may be better understood.

BRIEF DESCRIPTION OF THE FIGURES

FIG. 1(*b*) is a graphical representation of the relationship between the matrix dielectric constant and a bandwith;

FIG. 1(*c*) is a top plan cross section of a preferred embodiment of a composite material of the invention;

Figure 1A:
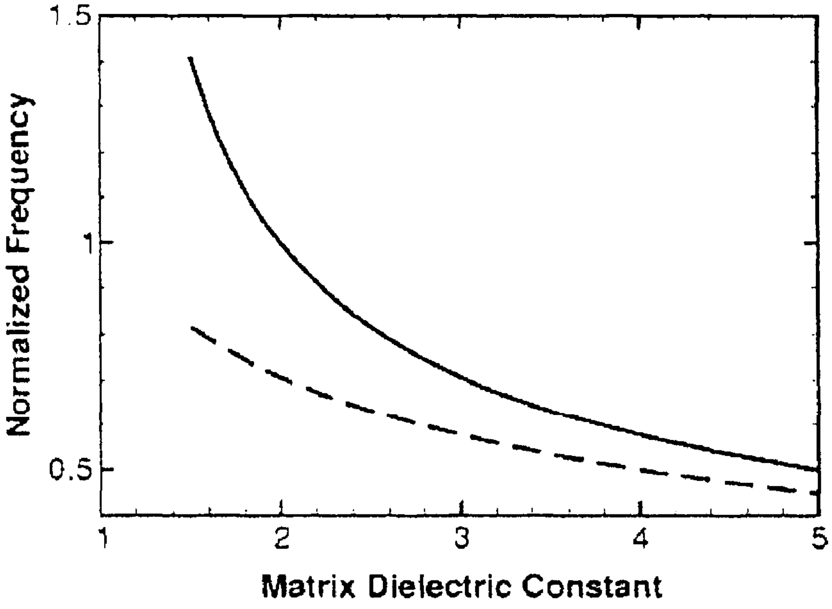
FIG. 1(*a*) is a graphical representation of the relationship between a matrix dielectric constant and a normalized frequency.
Figure 1B:
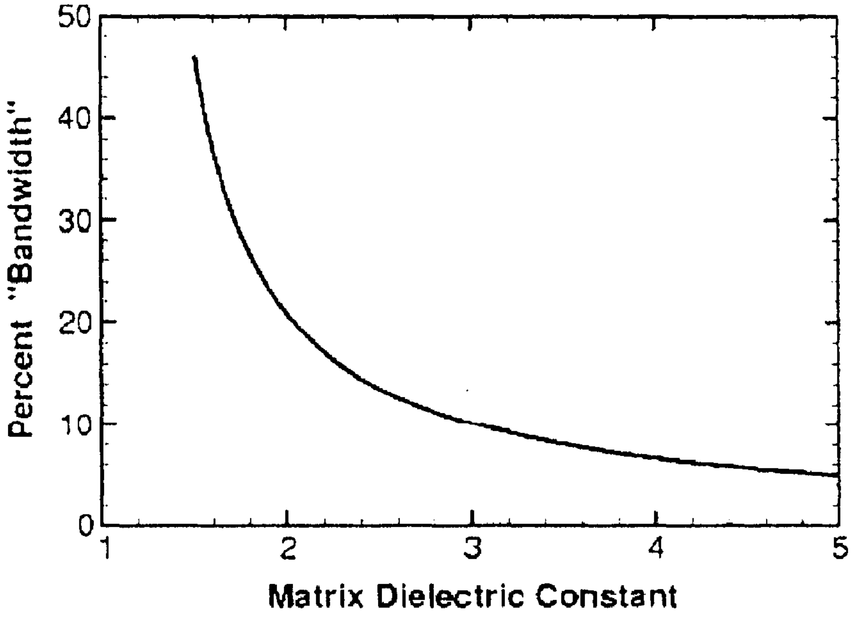
Figure 1C:
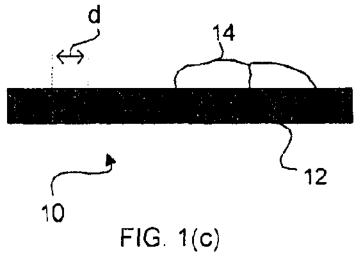

DETAILED DESCRIPTION:

In order to describe the best known modes of practice of the present invention, it will be useful to first discuss some relevant properties and relationships of physics. The wavelength λ, the frequency f of electromagnetic radiation, and the velocity v are related by:

$$v=\lambda f$$

The angular frequency ω is related to the frequency by a constant:

$$\omega=2\pi f$$

In dimensionless quantities, then, ratios of frequencies can be used interchangeably:

$$(f_1/f_2)=(\omega_1/\omega_2)$$

In order to describe the presence of a material, Maxwell's equations must be solved in the presence of the material. The local electromagnetic response of a material—the exact electric and magnetic field distributions that occur near the atoms or elements that compose the material—will in general be very complicated. However, since the exact nature of the local fields in a material is usually unimportant to the behavior of the electromagnetic waves propagating through the material, the local fields are typically averaged to obtain a set of Maxwell's equations that includes the material properties in two parameters: ∈ and μ.

A simple example of an idealized medium is the Drude medium, which in certain limits describes such systems as conductors and dilute plasmas. The averaging process leads to a permittivity that, as a function frequency, has the form $$\epsilon(f)/\epsilon_0=1-f_p^2/f(f+iv) \qquad \text{EQTN. A}$$

where f is the electromagnetic excitation frequency, $f_p$ is the plasma frequency and v is a damping factor. In general, the plasma frequency may be thought of as a limit on wave propagation through a medium: waves propagate when the frequency is greater than the plasma frequency, and waves do not propagate (e.g., are reflected) when the frequency is less than the plasma frequency. Simple conducting systems (such as plasmas) have a dispersive dielectric response. The degree to which an artificial medium obeys EQTN. A must often be determined empirically and depends on the construction materials and on the geometric properties that determine $f_p$ relative to the inter-element spacing of the metal scattering elements.

The plasma frequency is the natural frequency of charge density oscillations ("plasmons"), and may be expressed as:

$$\omega_p=[n_{eff}e^2/\epsilon_0 m_{eff}]^{1/2}$$

and $$f_p=\omega_p/2\pi$$

where $n_{eff}$ is the charge carrier density and $m_{eff}$ is an effective carrier mass. For the carrier densities associated with typical conductors, the plasma frequency $f_p$ usually occurs in the optical or ultraviolet bands.

The Pendry reference that has been incorporated herein by reference teaches a thin wire media—in which the wire diameters are significantly smaller than the skin depth of the metal—can be engineered with a plasma frequency in the microwave regime, below the point at which diffraction due to the finite wire spacing occurs. By restricting the currents to flow in thin wires, the effective charge density is reduced, thereby lowering the plasma frequency. Also, the inductance associated with the wires acts as an effective mass that is larger than that of the electrons, further reducing the plasma frequency. By incorporating these effects, the Pendry reference provides the following prediction for the plasma frequency of a thin wire medium:

$$f_p^2=\frac{1}{2\pi}\left(\frac{c_0^2/d^2}{\ln\left(\frac{d}{r}\right)-\frac{1}{2}(1+\ln\pi)}\right)$$

where $c_0$ is the speed of light in a vacuum, d is the thin wire lattice spacing, and r is the wire diameter. The length of the wires is assumed to be infinite and, in practice, preferably the wire length should be much larger than the wire spacing, which in turn should be much larger than the radius.

By way of example, the Pendry reference suggests a wire radius of approximately one micron for a lattice spacing of 1 cm—resulting in a ratio, d/r, on the order of or greater than $10^5$. Note that the charge mass and density that generally occurs in the expression for the $f_p$ are replaced by the parameters (e.g., d and r) of the wire medium. Note also that the interpretation of the origin of the "plasma" frequency for a composite structure is not essential to this invention, only that the frequency-dependent permittivity have the form as above, with the plasma (or cutoff) frequency occurring in the microwave range or other desired ranges.

Any conducting element that has an inductance can also be utilized as the repeated element that forms a plasmonic medium. In the thin wire medium, increased inductance is primarily achieved by making the wires very thin; However, the inductance can also be increased by other means, such as arranging inductive loops within the medium, or even the inclusion of actual inductive elements within the circuit. Thicker loop-wire media can be comprised, for example, of wire coils or wire lengths having periodic loops.

An embodiment of the present invention is directed to a composite, or hybrid, material comprised of a host dielectric with an artificial plasmon medium embedded therein, whereby the composite material has an index of refraction and impedance both substantially equal to that of the surrounding medium. As discussed below, it is assumed that the index of refraction and impedance of the medium are both measured relative to the surrounding medium, and accordingly the term "relative" as used herein in describing terms such as "index" and "impedance" is intended to refer to a comparison to the surrounding medium. An invention embodiment may be considered an artificial plasmon medium. Behavior of embodiments of the present invention is modeled on the assumption that the host dielectric has a uniform dielectric constant or function (it is noted that as used herein the terms dielectric constant and dielectric function are intended to be interchangeable). However, an effective dielectric function of the host medium can be substituted for the uniform constant and the properties in the frequency range of interest will be substantially unchanged.

The conductivity of the conducting elements of the composite embodiments of the present invention approaches infinity, but any good metal conductor such as copper or silver provides a close behavioral agreement to ideal simulations. For the composite material, the effective permittivity $\epsilon_E$ is expressed as:

$$\epsilon_E/\epsilon_0=\epsilon_H/\epsilon_0-(\omega_p/\omega)^2$$

where $\epsilon_H$ is the permittivity of the host material and $\omega$ is the angular frequency of the electromagnetic radiation. Using the above relations, it may be derived that:

$$\eta=[\epsilon_H/\epsilon_0-(f_p^2/f^2)]^{1/2}$$

The composite materials of the present invention follow these relationships, and achieve good transparency and low reflectance for electromagnetic radiation in a desired frequency range. By way of example, a conductor of the present invention may be varied in spacing and/or geometry to control the plasma frequency $\omega_p$, and thereby "tune" the composite of the invention.

In the absence of the dielectric, the only variable parameter for behavior of a plasmon medium is the plasma frequency $f_p$, with the index of refraction able to be expressed as $$\eta=(\kappa)^{1/2}=[1-(f_p^2/f^2)]^{1/2}$$

where $\kappa=\epsilon/\epsilon_0$. The dielectric function of the composite of course changes upon addition of the dielectric. The presence of a dielectric matrix into which the plasmon medium is embedded will result in a polarization response that can be accounted for by introducing $\kappa_0$ such that:

$$\kappa=\kappa_0-(f_p^2/f^2)$$

where $\kappa$ is the effective dielectric constant of an ideal plasmon/dielectric composite material. The dipolar response term $\kappa_0$ is substantially equal to the effective dielectric constant of the polymer composite matrix in the absence of the integrated artificial plasmon medium when that medium closely obeys EQTN. A and also occupies a negligible volume fraction of the composite.

With the addition of the dielectric host matrix, the dielectric constant or function $\kappa$ takes a value of unity at a finite frequency $f_1=f_p/(\kappa_0-1)^{1/2}$. The frequency $f_1$ may be referred to as the "match frequency," the frequency at which $\kappa=1$, the index $\eta=1$, and there is substantially no refraction at an interface between air and the ideal composite material.

The frequency at which $\kappa=0$ determines the onset of electromagnetic wave propagation. This "turn-on" frequency is given by:

$$f_0=\frac{f_p}{\sqrt{\kappa_0-1}}$$

FIGS. 1(*a*) and 1(*b*) illustrate the dependence of $f_0$ and f on the matrix dielectric function. FIG. 1 (*a*) shows the turn-on frequency $f_0$ (dashed line) and match frequency $f_1$ (solid line) as a function of the matrix dielectric constant $\kappa_0$ where the normalized frequency is in units of the plasma frequency $f_p$, while FIG. 1(*b*) shows the bandwidth as a function of the matrix dielectric constant $\kappa_0$ where the percent bandwidth is defined as $(f_{n=1.1}-f_{n=0.9})/f_1$. This illustrates the increased dispersion around n=1 as $\kappa_0$ increases.

The present invention may be further described through reference to example structural embodiments. In considering the FIGS. Used to illustrate these structural embodiments, it will be appreciated that they have not been drawn to scale, and that some elements have been exaggerated in scale for purposes of illustration. FIGS. 1(*c*) and 2 show a top plan cross section and a side elevational cross section, respectively, of a portion of an embodiment of a composite material 10 of the present invention. The composite material 10 comprises a dielectric host 12 and a conductor 14 embedded therein. It is noted that the term "dielectric" as used herein in reference to a material is intended to broadly refer to materials that have a relative dielectric constant greater than 1, where the relative dielectric constant is expressed as the ratio of the material permittivity $\in$ to free space permittivity $\in_0$ ($8.85\times10^{-12}$ F/m). In more general terms, dielectric materials may be thought of as materials that are poor electrical conductors but that are efficient supporters of electrostatic fields. In practice most dielectric materials, but not all, are solid. Examples of dielectric materials useful for practice of embodiments of the current invention include, but are not limited to, porcelain such as ceramics, mica, glass, and plastics such as thermoplastics, polymers, resins, and the like.

The term conductor as used herein is intended to broadly refer to materials that provide a useful means for conducting current. By way of example, many metals are known to provide relatively low electrical resistance with the result that they may be considered conductors. Preferred conductors for the practice of embodiments of the invention include aluminum, copper, gold, and silver.

Figure 2:
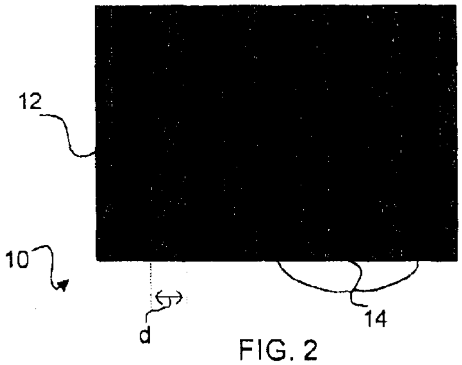
FIG. 2 is a side elevational cross section of the embodiment of FIG. 1 taken along the line 2-2.

As illustrated by FIGS. 1 and 2, the preferred conductor 14 comprises a plurality of portions that are generally elongated and parallel to one another, with a space between portions of distance d. Preferably, d is less than the size of a wavelength of the incident electromagnetic waves. Spacing by distances d of this order allow the composite material of the invention to be modeled as a continuous medium for determination of permittivity $\in$. Also, the preferred conductors 14 have a generally cylindrical shape.

A most preferred conductor 14 comprises thin copper wires. These conductors offer the advantages of being readily commercially available at a low cost, and of being relatively easy to work with. Also, matrices of thin wiring have been shown to be useful for comprising an artificial plasmon medium, as discussed by Pendry et al., "Extremely Low Frequency Plasmons in Metallic Mesostructures," Physical Review Letters, 76(25):4773-6, 1996; incorporated by reference herein.

Figure 3:
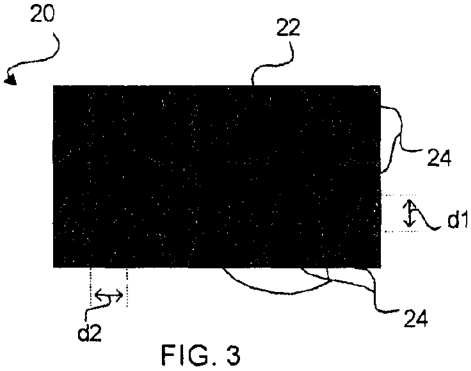
FIG. 3 is a top plan cross section of an additional preferred embodiment of a composite material of the invention.

FIG. 3 is a top plan cross section of another composite material embodiment 20 of the present invention. The composite material 20 comprises a dielectric host 22 and a conductor that has been configured as a plurality of portions 24. As with the embodiment 10, the conductor portions 24 of the embodiment 20 are preferably elongated cylindrical shapes, with lengths of copper wire most preferred. The conductor portions 24 are preferably separated from one another by distances d1 and d2 as illustrated with each of d1 and d2 being less than the size of a wavelength of an electromagnetic wave of interest. Distances d1 and d2 may be, but are not required to be, substantially equal. The conductor portions 24 are thereby regularly spaced from one another, with the intent that the term "regularly spaced" as used herein broadly refer to a condition of being consistently spaced from one another.

It is also noted that the term "regularly spacing" as used herein does not necessarily require that spacing be equal along all axis of orientation (e.g., d1 and d2 are not necessarily equal). Finally, it is noted that FIG. 3 (as well as all other FIGS.) have not been drawn to any particular scale, and that for instance the diameter of the conductors 24 may be greatly exaggerated in comparison to d1 and/or d2.

Figure 4:
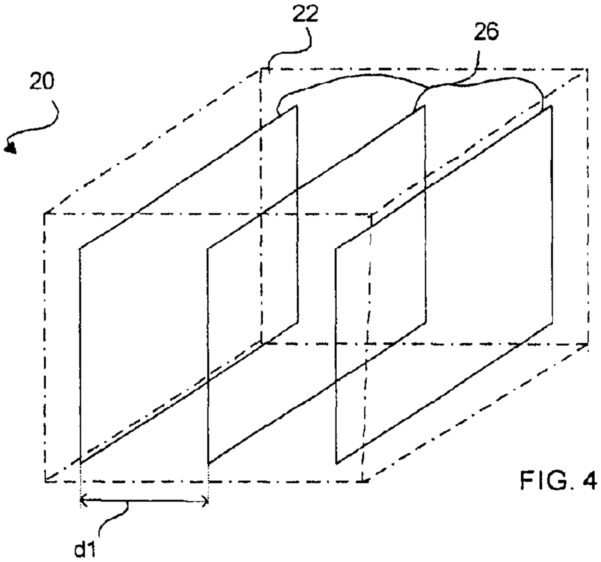
FIG. 4 is a schematic perspective of the embodiment of FIG. 3.

As illustrated, the individual conductors may be thought of as organized in a plurality of planar layers separated from one another by the distance d2, as shown in the perspective schematic representation of FIG. 4 where each planar layer 26 represents a plurality of parallel conductors 24, and where the dielectric host 22 is illustrated as a transparent dashed line "box". The embodiment 20 may also be thought of as having each plane of its conductors 24 in a single "dimension." That is, the conductors 24 in each plane generally lie along a single axis of orientation (e.g., the x-axis).

Figure 5:
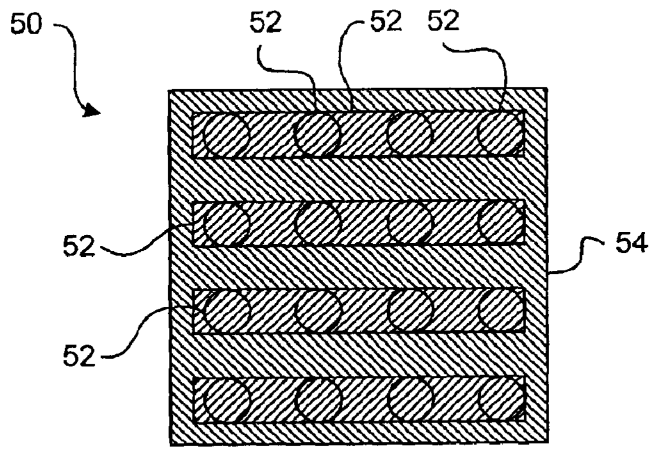
FIG. 5 is a top plan cross section of an additional preferred embodiment of a composite material of the invention.
Figure 6:
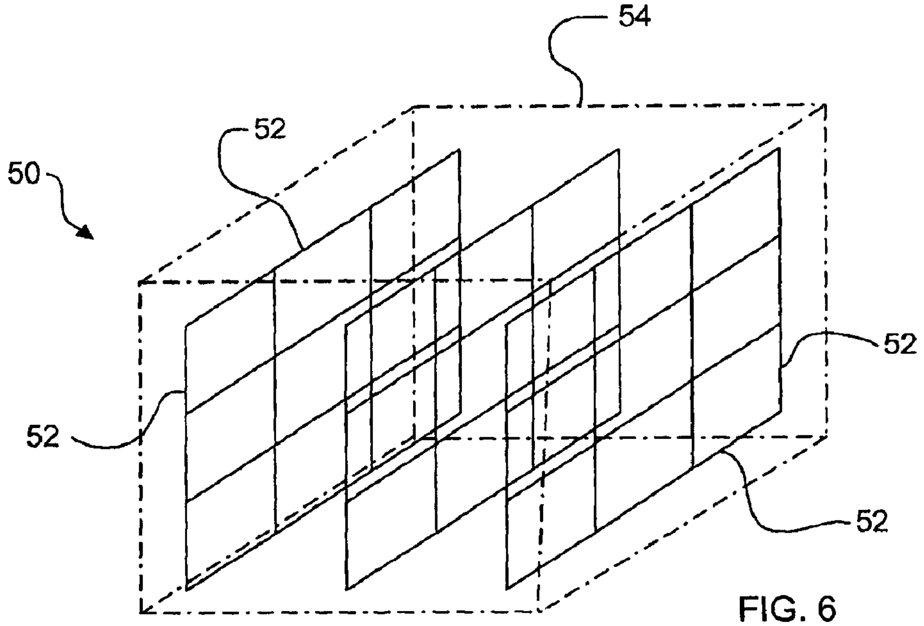
FIG. 6 is a perspective schematic representation of the embodiment of FIG. 5.

Other embodiments of the invention will comprise conductors oriented along more than one axis of orientation. The composite material embodiment 50 represented by FIGS. 5 and 6, for example, illustrates the conductors 52 oriented along two axes and embedded in a dielectric host 54. The conductors 52 in the composite material embodiment 50 may be thought to generally extend along both the x-axis and the y-axis. This is illustrated schematically in FIG. 6, with the conductors 52 represented as lines, and the dielectric host 54 represented as a dashed line box. Such a configuration thereby can also be considered to have a plurality of first conductors 52 organized into substantially planar rows, and a plurality of second conductors 52 organized into substantially planar columns. When laid out along an x and y axis as in the embodiment 50, these planes are substantially normal to one another. The planar columns are preferably separated from one another by a distance less than a wavelength of electromagnetic wave of interest, with the planar rows likewise preferably spaced.

Figure 7:
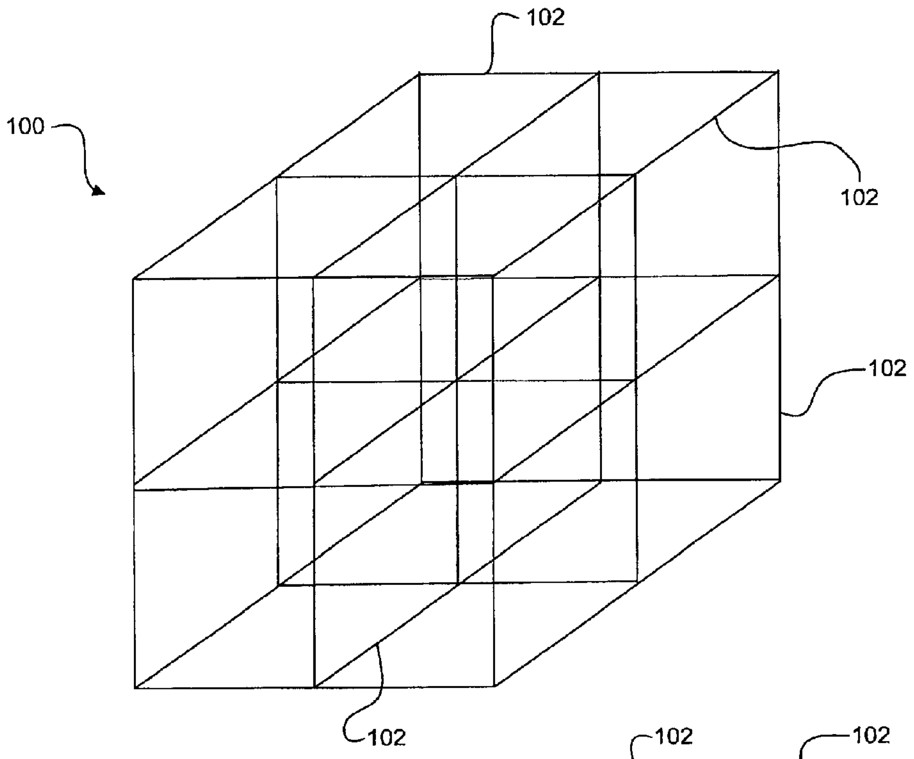
FIG. 7 is a perspective schematic representation of an additional preferred embodiment of a composite material of the invention.
Figure 8:
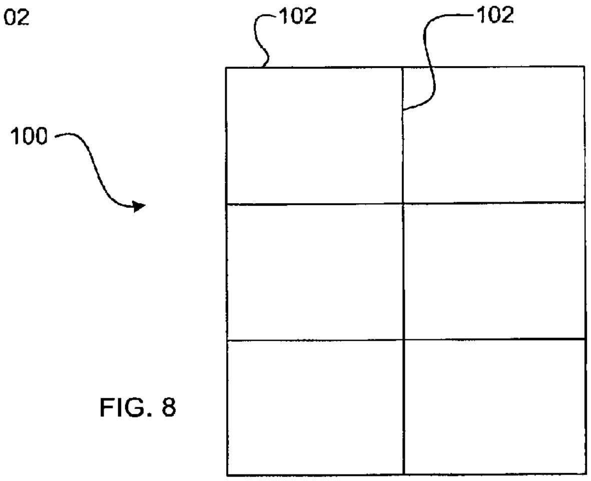
FIG. 8 is a top plan schematic representation of the embodiment of FIG. 7.

Other invention embodiments may additionally comprise conductors oriented along additional axes. By way of example, a composite material 100 is represented schematically in the perspective view of FIG. 7 and the top plan view of FIG. 8. With reference to FIG. 7, a plurality of conductors 102 represented as lines may be oriented along the x, y and z axis to result in a "three dimensional" configuration. Those skilled in the art will appreciate that other conductor orientations are also possible within the present invention.

Figure 9A:
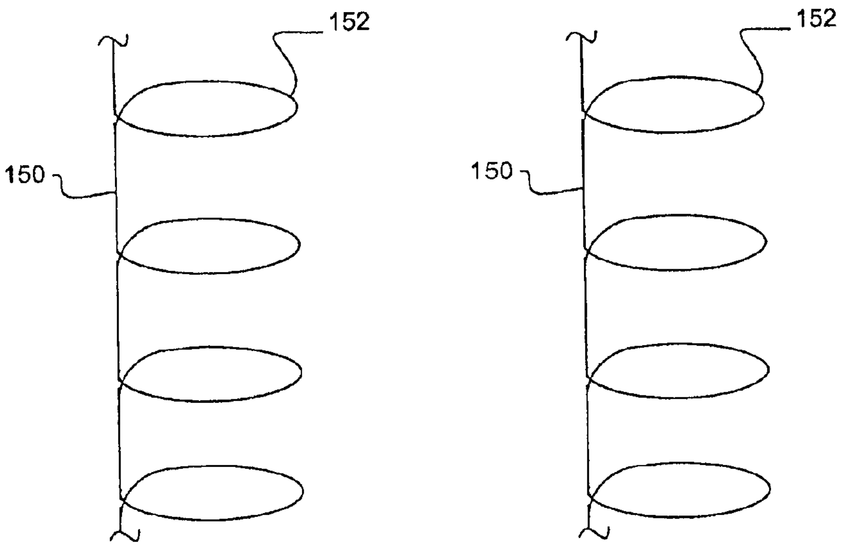
FIGS. 9(*a*)-(*c*) illustrate some alternative conductors of the invention.
Figure 9B:
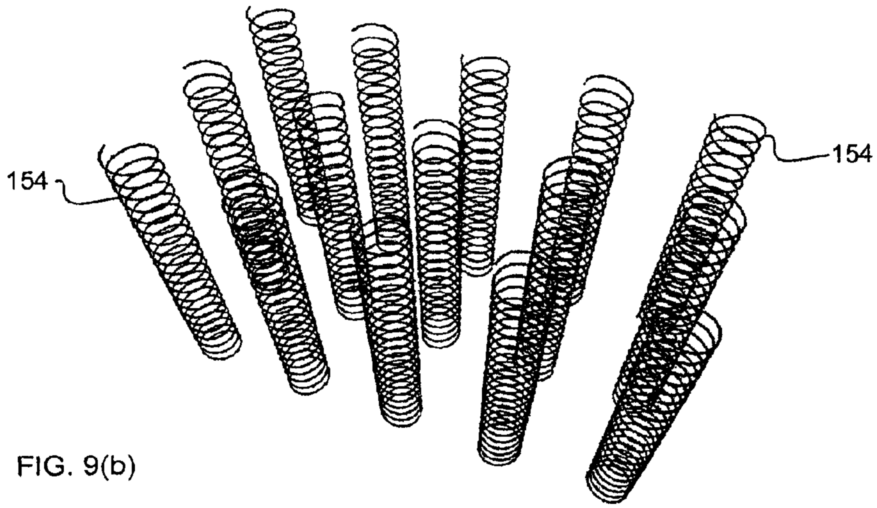
Figure 9C:
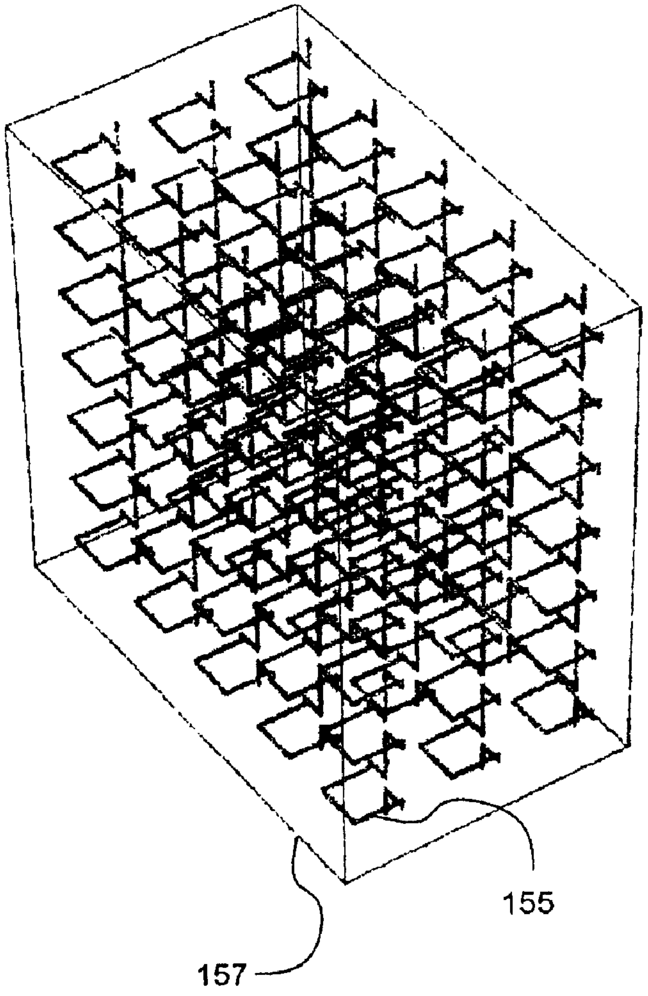

It will also be appreciated that conductors of embodiments of the present invention may comprise configurations other than substantially straight portions as shown in the embodiments 10, 20, and 50. Indeed, depending on a particular application it may be desirable to "tune" the composite material by altering the electrical properties of the conductor. By way of example, the diameter, geometry, and/or spacing of the conductor could be altered. With reference to FIGS. 9(*a*)-(*c*) by way of example, alternate conductor shapes are illustrated. FIG. 9(*a*) shows conductors 150 with a plurality of loops 152. The loops 152 are preferably of substantially uniform diameter, and are preferably substantially regularly spaced along the length of the conductors 150. That is, a substantially uniform distance preferably separates each loop 152 along a length of a conductor 150. Those knowledgeable in the art will appreciate that the loops 152 comprise inductive elements, and thereby serve to increase the impedance of the conductors 150. Varying the diameter and number of the loops 152 will of course alter the electrical properties of the conductors 150, and may thereby be used to further "tune" a resulting composite material so that the composite refractive index and/or reflection coefficient is substantially equal to 1.

FIG. 9(*b*) shows conductors 153 in the form of spring-like coils. It will be appreciated that the conductors 150 or 153 may be used in combination with a dielectric host to comprise a composite material of the invention. By way of illustration, the conductors 150 or 154 could be used in any of the embodiments 10, 20, 50 or 100 of FIGS. 1 (*c*)-8. FIG. 9(*c*), for instance, shows an additional alternate conductor 155 embedded in a host dielectric 157. The conductor 155 is characterized in that each conductor 155 has a number of individual linked portions that are substantially straight, are at right angles to one another, with each of the portions lying along one of the x, y or z axes.

Those knowledgeable in the art will appreciate that many additional conductor geometries will be useful in practice of the invention. By way of example, non-cylindrical geometries comprising substantially square, rectangular, or eleptical cross sections may be of use.

Figure 10:
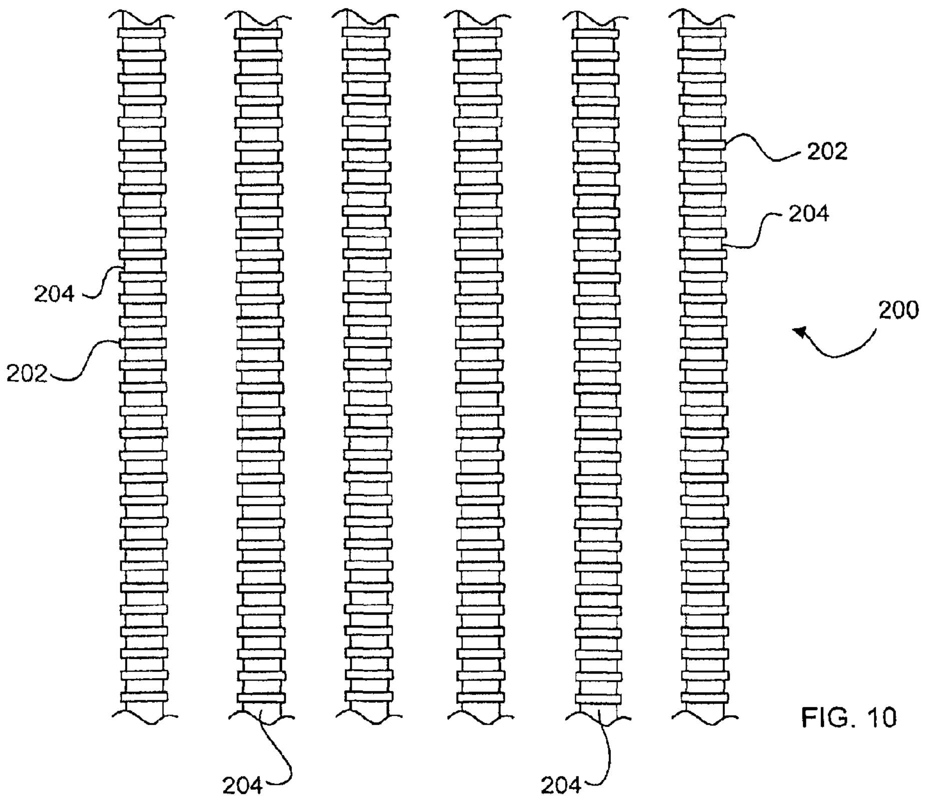
FIG. 10 is a side elevational view of a portion of an additional preferred embodiment of the invention.
Figure 11:
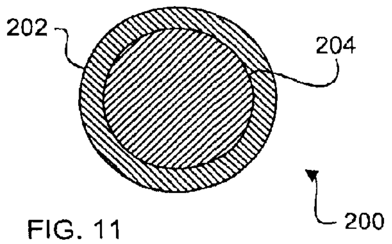
FIG. 11 is a top plan cross-section view of a portion of the embodiment of FIG. 10.

FIG. 10 is a side elevational view of a portion of an additional embodiment 200 of the invention comprising a loop-wire artificial plasmon composite material. The embodiment 200 comprises a plurality of conductors 202 that may be considered to have the geometry of the conductors 150 or 154 of FIG. 9(*a*) or (*b*). That is, the conductors 202 generally may comprise a plurality of connected loops, or may comprise coils. The conductors 202 are wrapped around a dielectric host, which is in the form of a plurality of elongated members 204 that may comprise by way of example nylon rods. The nylon rods are preferably substantially parallel to one another, and are preferably separated from one another by a substantially equal distance. FIG. 11 is a top plan cross section of a portion of the embodiment 200, illustrating the conductor 202 surrounding the dielectric nylon rod host 204.

Figure 12:
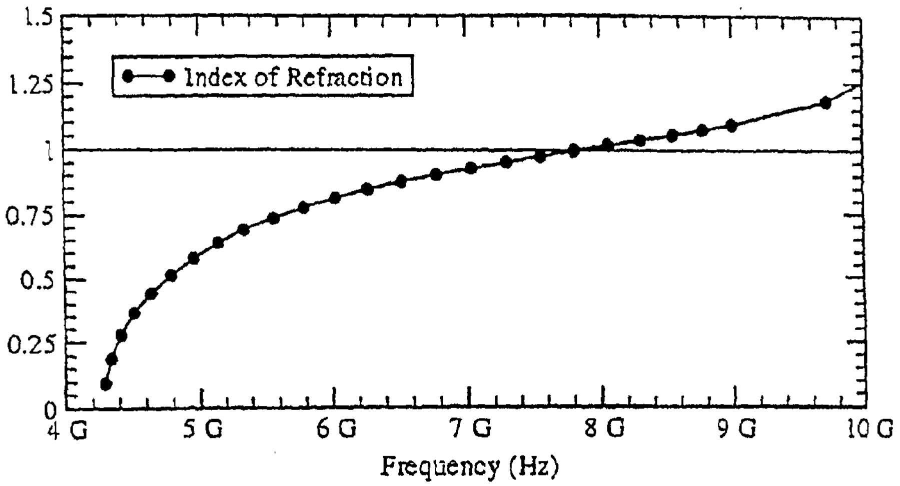
FIGS. 12(*a*) and (*b*) are plots showing computer simulation based electrical properties of the embodiment of FIG. 11.
Figure 12:
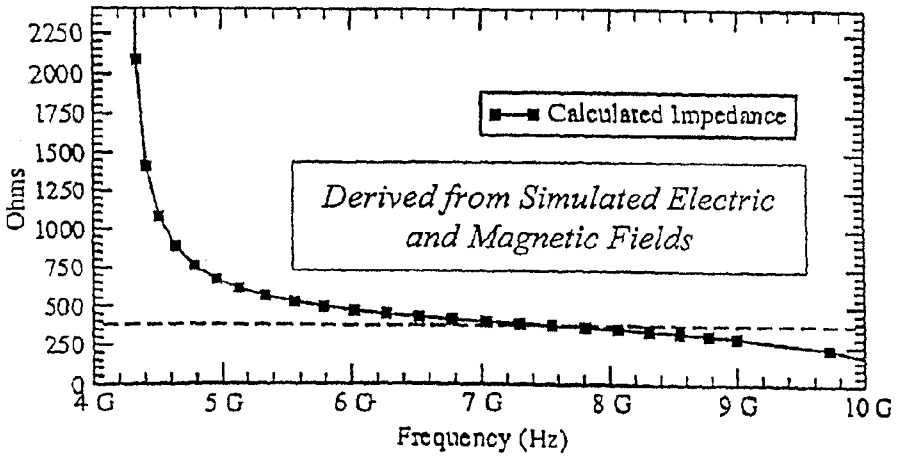

It will be appreciated that the composite material 200 of FIGS. 10-11 is tunable by design by altering the wire conductor 202 diameter and spacing, for instance, to achieve an index of refraction and impedance as may be desired for electromagnetic waves in a desired wavelength range. FIGS. 12(*a*) and (*b*) illustrate the result of computer simulations run on the composite material 200, using thin copper wire as the conductor having vertical spacing between loops of about 8 mm, horizontal spacing between rods of about 8 mm, and using 6-32 nylon rods. FIGS. 12(*a*) and (*b*) show a predicted matching condition close to 8 GHz.

One advantage of embodiments of the composite material of the present invention is that the composites can achieve mechanical strength and may be desirably conformed for particular applications. Indeed, those knowledgeable in the art will appreciated that using a preferred dielectric host such as a polymer and a preferred conductor such as thin copper wire, composite materials of the invention will lend themselves well to being readily configured to a multiplicity of applications. By way of example, a composite material of the invention may have utility as an electromagnetically transparent "window" for covering electronics. Examples include, but are not limited to, mechanically protective but electromagnetically transparent electronics housings and cabinets, antennae for communications devices such as cellular phones and transmission centers, building materials for structures used for communications such as satellite stations, "stealth" materials for military applications including airplanes, ships, submarines, land vehicles, individual armor; and the like.

Figure 13:
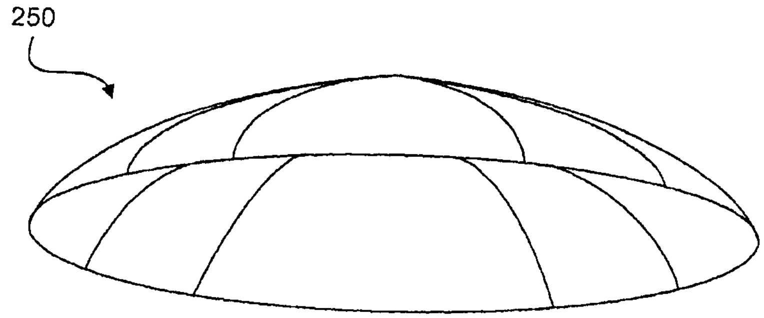
FIG. 13 is a perspective view of a preferred radome embodiment of the invention.
Figure 14:
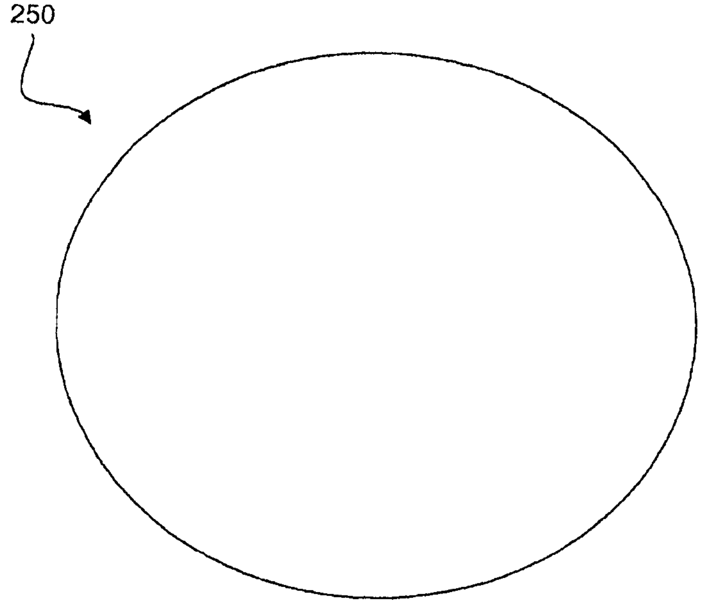
FIG. 14 is a bottom plan view of the radome embodiment of FIG. 13.
Figure 1C:
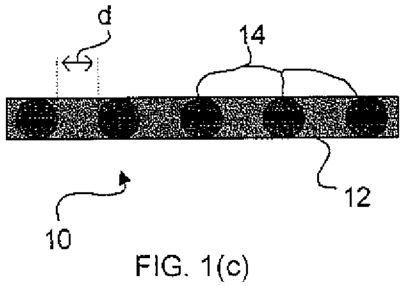
Figure 2:
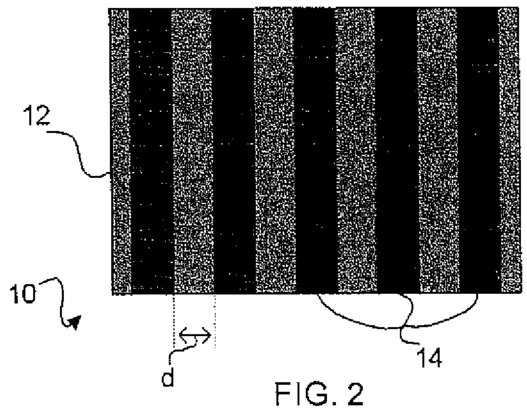
Figure 3:
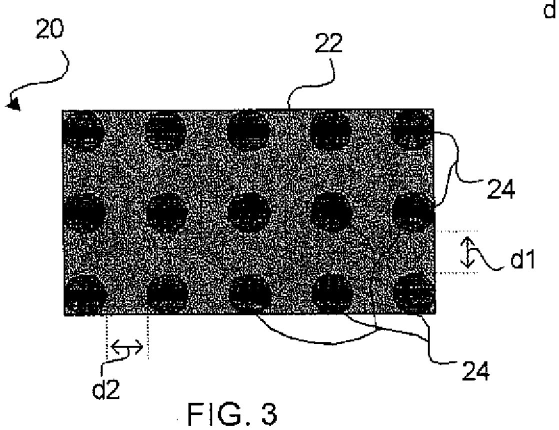
Figure 4:
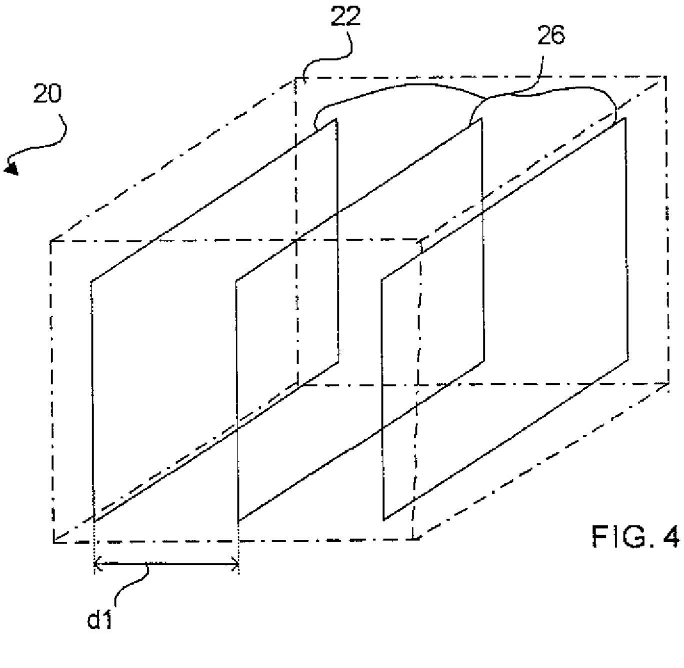

A particular example is shown in FIGS. 13-14, where a composite material 250 of the invention has been configured in the general shape of a "dome" for use as a radome for covering radar equipment. The perspective view of FIG. 13 shows the general "inverted bowl" shape of the radome 250, with radar or other electronics equipment able to be covered by the radome 250. The plan view of FIG. 14 illustrates the general circular circumference of the radome 250. The radome 250 is constructed of a composite material of the invention, which may comprise by way of example plastic or glass having an embedded thin wire conductor matrix therein.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims. By way of example, electromagnetic transparency and reflection have been discussed herein for invention embodiments with the general assumption that measurements are relative to free space. Those skilled in the art, however, will appreciate that composite materials of the present invention will have utility in various environments other than free space. By way of example only, it is anticipated that composite materials of the present invention may have utility used in water, underground, and the like.

What is claimed is:

1. An electromagnetically transparent composite material useful to transmit electromagnetic waves comprising:

a host dielectric effective medium having an index of refraction greater than 1; and an artificial plasmon medium embedded in said host medium, said artificial plasmon medium having a dielectric function less than 1, said artificial plasmon medium having a plasma frequency selected to result in the permittivity of the composite material being substantially equal to 1 for incident electromagnetic radiation of a desired frequency wherein said entire composite material defined by said host medium and said artificial plasmon medium is electromagnetically transparent to said incident electromagnetic radiation and does not reflect said incident electromagnetic radiation.

2. An electromagnetically transparent composite material as defined by claim 1 wherein said artificial plasmon medium is selected and spatially arranged to result in the composite material having the permeability substantially equal to 1 for incident electromagnetic radiation of a desired frequency.

3. An electromagnetically transparent composite material as defined by claim 1 wherein said artificial plasmon medium is selected and spatially arranged to result in the composite material having both the relative index-of-refraction and the relative impedance both equal to 1.

4. An electromagnetically transparent composite material as defined by claim 1 wherein said host dielectric medium has a dielectric constant $\in_{host}$, said artificial plasmon medium has a plasma frequency $f_p$, and the composite material has an effective permittivity $\in_{eff}$ defined by:

$$\in_{eff}=\in_{host}-(f_p/f)^2$$

where f is the frequency of incident electromagnetic radiation.

5. An electromagnetically transparent composite material as defined by claim 1 wherein said permittivity is expressed as: $\in_{eff}=\in_{host}-(f_p/f)^2$ where $f_p$ is said artificial plasmon medium plasma frequency, and f is said frequency of the incident electromagnetic radiation.

6. An electromagnetically transparent composite material as defined by claim 1 wherein said artificial plasmon medium comprises a conductor.

7. An electromagnetically transparent composite material as defined by claim 1 wherein said artificial plasmon medium comprises elongated metal elements spaced apart from one another by a distance d less than the wavelength of said incident electromagnetic radiation.

8. An electromagnetically transparent composite material as defined by claim 1 wherein said artificial plasmon medium comprises metal wire.

9. An electromagnetically transparent composite material as defined by claim 8 wherein said metal wire conductor is arranged as a lattice having a spacing d between lattice members, and has a plasma frequency defined by:

$$f_p^2 = \frac{1}{2\pi}\left(\frac{c_0^2/d^2}{\ln\left(\frac{d}{r}\right) - \frac{1}{2}(1+\ln\pi)}\right)$$

where $c_0$ is the speed of light in a vacuum, and r is said wire radius.

10. An electromagnetically transparent composite material as defined by claim 9 wherein said metal wire conductor is selected and arranged to result in a plasma frequency substantially equal to said desired frequency.

11. An electromagnetically transparent composite material as defined by claim 1 wherein said artificial plasmon medium comprises a material selected from the group consisting of aluminum, copper, gold, and silver.

12. An electromagnetically transparent composite material as defined by claim 1 wherein said artificial plasmon medium comprises a plurality of regularly spaced continuous elements.

13. An electromagnetically transparent composite material as defined by claim 12 wherein said regularly spaced artificial plasmon medium elements are substantially planar with one another, and are configured in three dimensions with said elements extending along each of an X, Y and Z axis, said regularly spaced elements arranged along a plurality of planes within said dielectric medium, at least some of said planes normal to others of said plurality of planes.

14. An electromagnetically transparent composite material as defined by claim 12 wherein said plurality of regularly spaced elements are organized into a plurality of planes, each of said planes comprising a plurality of regularly spaced continuous conductor elements planar with one another.

15. An electromagnetically transparent composite material as defined by claim 14 wherein at least one of said plurality of artificial plasmon medium planes is substantially normal to at least a second of said plurality of artificial plasmon medium planes.

16. An electromagnetically transparent composite material as defined by claim 12 wherein said artificial plasmon medium elements comprise a plurality of substantially straight and continuous lengths substantially parallel to one another and that have substantially equal lengths.

17. An electromagnetically transparent composite material as defined by claim 16 wherein each of said lengths includes a plurality of inductive elements configured to produce a selected local inductive component .

18. An electromagnetically transparent composite material as defined by claim 12 wherein each of said elements comprises a length of metal wire having a plurality of substantially regularly spaced turns configured to adjust the impedance of said lengths of metal wire and to thereby affect the plasma frequency of said artificial plasmon medium.

19. An electromagnetically transparent composite material as defined by claim 12 wherein said plurality of regularly spaced elements are spaced from one another by a distance that is not greater than a wavelength corresponding to the wavelength of the incident electromagnetic radiation.

20. An electromagnetically transparent composite material as defined by claim 1 wherein said dielectric host comprises one or more members selected from the group consisting of: thermoplastics, ceramics, oxides of metals, and mica.

21. An electromagnetically transparent composite material as defined by claim 1 wherein said dielectric host comprises a three dimensional solid, and wherein said artificial plasmon medium includes a plurality of individual elements configured in three dimensions within said dielectric host, said individual elements extending along each of an X, Y and Z axis.

22. An electromagnetically transparent composite material as defined by claim 1 wherein said dielectric host has substantially planar first and second surfaces, and wherein at least a portion of said artificial plasmon medium comprises a substantially planar shape substantially parallel to said dielectric host first and second surfaces.

23. An electromagnetically transparent composite material as defined by claim 1 wherein said host dielectric effective medium has a general bowl shape.

24. An electromagnetically transparent composite material as defined by claim 1 wherein said host dielectric effective medium comprises an enclosure for containing electronics.

25. An electromagnetically transparent material as defined by claim 1 wherein said artificial plasmon medium comprises a material selected from the group of materials consisting of periodic arrangements of metal scattering elements, psuedo-periodic arrangements of metal scattering elements, and random arrangements of metal scattering elements.

26. An electromagnetically transparent composite material for transmitting electromagnetic waves therethrough comprising:

a host dielectric effective medium having an index of refraction greater than 1, said host dielectric effective medium comprising a three dimensional solid material; and an artificial plasmon medium embedded in said host medium, said artificial plasmon medium having a dielectric function less than 1, said artificial plasmon medium having a plasma frequency selected to result in the permittivity and the permeability of the composite material being substantially equal to 1 for incident electromagnetic radiation of a desired frequency, said artificial plasmon medium comprising a plurality of continuous elongated metal elements extending along three dimensions within said host dielectric medium and spaced apart from one another by a distance less than the wavelength of said incident electromagnetic radiation.

27. An electromagnetically transparent composite material as defined by claim 1 wherein said artificial plasmon medium comprises a plurality of regularly spaced continuous portions that are substantially planar with one another, and are configured in three dimensions with said portions extending along each of an X, Y and Z axis, said regularly spaced portions arranged along a plurality of planes within said dielectric medium, at least some of said planes normal to others of said plurality of planes.

28. An electromagnetically transparent composite material as defined by claim 1 wherein said dielectric host comprises a three dimensional solid, and wherein said artificial plasmon medium includes a plurality of individual portions configured in three dimensions within said dielectric host, said individual portions extending along each of an X, Y and Z axis.

29. An electromagnetically transparent composite material useful to transmit electromagnetic waves comprising:

a host dielectric effective medium having an index of refraction greater than 1; and an artificial plasmon medium embedded in said host medium, said artificial plasmon medium having a dielectric function less than 1, said artificial plasmon medium having a plasma frequency selected to result in the permittivity of the composite material being substantially equal to 1 for incident electromagnetic radiation of a desired frequency wherein said composite material defined by said host medium and said artificial plasmon medium is electromagnetically transparent to said incident electromagnetic radiation and does not reflect said incident electromagnetic radiation.

* * * * *

UNITED STATES PATENT AND TRADEMARK OFFICE

CERTIFICATE OF CORRECTION

PATENT NO. : 8,114,489 B2
APPLICATION NO. : 10/153502
DATED : February 14, 2012
INVENTOR(S) : Syrus C. Nemat-Nasser et al.

It is certified that error appears in the above-identified patent and that said Letters Patent is hereby corrected as shown below:

<u>On the Title Page</u>:

Title Page, Item (56), under “References Cited”:

Col. 2, line 19 After “Photonic”, please delete “and” and insert --Band-- therefor.

<u>In the Drawings</u>:

Sheet 2 of 9 Please delete Sheet 2, including Fig. 1(c), Fig. 2, Fig. 3, and Fig. 4 and insert Fig. 1(c), Fig. 2, Fig. 3, and Fig. 4 as shown on the attached replacement sheets.

<u>In the Specification</u>:

Col. 1, line 39 Please delete “parameters $\in$ and $\mu$ where $\in$ is the” and insert --parameters $\varepsilon$ and $\mu$ where $\varepsilon$ is the-- therefor.

Col. 1, line 54 Please delete “$\eta=[(\in\mu)/(\in 0\mu 0)]1/2$” and insert --$\eta=[(\varepsilon\mu)/(\varepsilon 0\mu 0)]1/2$-- therefor.

Col. 1, line 57 Please delete “$z=(\mu/\in)1/2/(\mu 0/\in 0)1/2$” and insert --$z=(\mu/\varepsilon)1/2/(\mu 0/\varepsilon 0)1/2$-- therefor.

Col. 1, line 64 Please delete “$\in=\eta/z$” and insert --$\varepsilon=\eta/z$-- therefor.

Col. 4, line 48 Please delete “$\in$” and insert --$\varepsilon$-- therefor.

Col. 4, line 54 Please delete “$\in(f)/\in_0=1-f_p^2/f(f+iv)$” and insert --$\varepsilon(f)/\varepsilon_0 = 1-f_p^2/f(f+iv)$-- therefor.

Col. 5, line 4 Please delete “$\omega_p = [n_{eff}e^2/\in_0 m_{eff}]^{1/2}$” and insert --$\omega_p = [n_{eff}e^2/\varepsilon_0 m_{eff}]^{1/2}$-- therefor.

Col. 6, line 14 Please delete “$\in_E$” and insert --$\varepsilon_E$-- therefor.

Col. 6, line 16 Please delete “$\in_E/\in_0=\in_H/\in_0-(\omega_P/\omega)^2$” and insert --$\varepsilon_E/\varepsilon_0=\varepsilon_H/\varepsilon_0-(\omega_P/\omega)^2$-- therefor.

Col. 6, line 21 Please delete “$\eta=[\in_H/\in_0-(f_p^2/f^2)]^{1/2}$” and insert --$\eta=[\varepsilon_H/\varepsilon_0-(f_p^2/f^2)]^{1/2}$-- therefor.

Col. 6, line 34 Please delete “where $\kappa=\in/\in_0$” and insert --$\kappa=\varepsilon/\varepsilon_0$-- therefor.

Col. 7, line 19 Please delete “permittivity $\in$ to free space permittivity $\in 0$ (8.85×10-12 F/m)” and insert --permittivity $\varepsilon$ to free space permittivity $\varepsilon 0$ (8.85×10-12 F/m)-- therefor.

Signed and Sealed this
Twenty-eighth Day of January, 2014

Michelle K. Lee

*Deputy Director of the United States Patent and Trademark Office*

Col. 7, line 41-42 Please delete “determination of permittivity ∈.” and insert --determination of permittivity ε.-- therefor.

<u>In the Claims</u>:

Col. 10, line 53
Claim 4 Replace “∈host” and insert --εhost-- therefor.

Col. 10, line 55
Claim 4 Please delete “∈eff” and insert --εeff-- therefor.

Col. 10, line 56
Claim 4 Please delete “∈eff = ∈host - (fp/f)2” and insert --εeff = εhost – (fp/f)2-- therefor.

Col. 10, line 62
Claim 5 Please delete “∈eff = ∈host - (fp/f)2” and insert --εeff = εhost – (fp/f)2-- therefor.

Col. 10, line 62
Claim 5 Please delete “*where* $f_p$” and insert --where fp-- therefor.